United States Patent
Rinckes et al.

(10) Patent No.: US 9,009,154 B2
(45) Date of Patent: Apr. 14, 2015

(54) EVALUATING PRESENTATION OF ADVERTISMENTS WITH REGARD TO RANKING ORDER

(75) Inventors: Doug Rinckes, London (GB); Ariel J. Gronau, London (GB)

(73) Assignee: Google Inc., Mountain View, CA (US)

( * ) Notice: Subject to any disclaimer, the term of this patent is extended or adjusted under 35 U.S.C. 154(b) by 435 days.

(21) Appl. No.: 12/243,558

(22) Filed: Oct. 1, 2008

(65) Prior Publication Data
US 2010/0082641 A1    Apr. 1, 2010

(51) Int. Cl.
*G06Q 30/00*    (2012.01)
*G06Q 30/02*    (2012.01)

(52) U.S. Cl.
CPC ..................... *G06Q 30/02* (2013.01)

(58) Field of Classification Search
USPC ......... 707/748, 736; 705/14.41, 14.46, 14.49, 705/10, 37
See application file for complete search history.

(56) References Cited

U.S. PATENT DOCUMENTS

| | | | |
|---|---|---|---|
| 7,752,072 B2 * | 7/2010 | Barry et al. ................... | 705/14.7 |
| 7,979,447 B2 * | 7/2011 | DaCosta ....................... | 707/754 |
| 2004/0019523 A1 | 1/2004 | Barry et al. | |
| 2004/0044571 A1 * | 3/2004 | Bronnimann et al. .......... | 705/14 |
| 2004/0190448 A1 * | 9/2004 | Fishteyn et al. ............... | 370/229 |
| 2005/0071224 A1 | 3/2005 | Fikes et al. | |
| 2006/0064647 A1 * | 3/2006 | Tapuska et al. ............... | 715/800 |
| 2006/0224445 A1 * | 10/2006 | Axe et al. ........................ | 705/14 |
| 2007/0260520 A1 * | 11/2007 | Jha et al. ......................... | 705/14 |
| 2007/0271145 A1 * | 11/2007 | Vest ................................. | 705/14 |
| 2008/0162329 A1 * | 7/2008 | Knapp et al. .................... | 705/37 |
| 2008/0270164 A1 * | 10/2008 | Kidder et al. ..................... | 705/1 |
| 2008/0313277 A1 * | 12/2008 | Altberg et al. ................ | 709/204 |
| 2009/0006213 A1 * | 1/2009 | Lerman et al. .................. | 705/14 |
| 2009/0112715 A1 * | 4/2009 | Steelberg et al. ............... | 705/14 |
| 2009/0177538 A1 * | 7/2009 | Brewer et al. ................... | 705/14 |
| 2009/0248585 A1 * | 10/2009 | Hsieh et al. ..................... | 705/80 |
| 2010/0023408 A1 * | 1/2010 | McNeill ..................... | 705/14.69 |
| 2010/0030647 A1 * | 2/2010 | Shahshahani ............. | 705/14.66 |
| 2010/0070996 A1 * | 3/2010 | Liao et al. ........................ | 725/35 |
| 2010/0138451 A1 * | 6/2010 | Henkin et al. ................ | 707/803 |

FOREIGN PATENT DOCUMENTS

KR    10-2003-0087580    6/2005

OTHER PUBLICATIONS

International Search Report and Written Opinion for International Application No. PCT/US2009/058973, dated Apr. 30, 2010, 11 pages.

(Continued)

*Primary Examiner* — Sherief Badawi
*Assistant Examiner* — Christopher J Raab
(74) *Attorney, Agent, or Firm* — Fish & Richardson P.C.

(57) ABSTRACT

First content configured for generating a media item is identified; a portion of the first content as being configured to obtain second content for presentation on the page is identified; and at least one parameter associated with the identified portion is identified, including determining whether the presentation of the plurality of advertisements in the media item reflects the ranking order.

40 Claims, 5 Drawing Sheets

(56) References Cited

OTHER PUBLICATIONS

'Geek Programms' Blog about Programming, web, technology, database and ummm . . . lot many things . . . !' [online]. Bolgs@DiGiTSS, [published on Mar. 9, 2008], [retrieved on Jul. 6, 2009]. Retrieved from the internet: http://blogs.digitss.com/misc/web-developer-toolbar-for-firefox-best-ever-extension-for-designerdeveloper/.

Pataki, Daniel, 'Web Developer Toolbar for Firefox' [online], makeusof.com, [published on May 21, 2008], [retrieved on Jul. 6, 2009]. Retrieved from the internet: http://www.makeuseof.com/tag/a-web-developer-toolbar-guide/.

* cited by examiner

EVALUATING PRESENTATION OF ADVERTISMENTS WITH REGARD TO RANKING ORDER

TECHNICAL FIELD

This document relates to content presentation.

BACKGROUND

Online advertising has taken on a substantial presence. In one example of online advertising, an advertisement can be presented as an identifiable portion or area on the screen, for example in form of a banner or a box. Advertising content, in turn, can be presented on a screen where there is also other content.

Advertisers or others may wish to evaluate the efforts directed to advertising. For example, online ads can include a designated area having a hyperlink that the viewer can click on to get more information or to purchase the offered goods or services. Such advertising clicks can be used for one or more purposes, including aggregation to determine whether sufficient interest is generated by the ad among the public, or to evaluate advertisement popularity.

SUMMARY

The invention relates to analyzing content to be displayed.

In a first aspect, a computer-implemented method for analyzing content to be displayed includes identifying first content configured for generating a media item. The method includes identifying a portion of the first content as being configured to obtain second content for presentation on the page. The portion is configured for requesting the second content from an advertisement distributor, the second content including at least one advertisement, and a publisher places the portion in the first content according to an agreement between the publisher and the advertisement distributor. The portion is configured to request a plurality of advertisements for presentation simultaneously in the media item, the plurality of advertisements being associated with a ranking order of relevance to the media item, and evaluating the parameter includes determining whether the presentation of the plurality of advertisements in the media item reflects the ranking order. The method includes evaluating at least one parameter associated with the identified portion, including determining whether the presentation of the plurality of advertisements in the media item reflects the ranking order.

Implementations can include any, all or none of the following features. Evaluating the parameter can include determining whether the media item conforms to the agreement. Evaluating the parameter can include determining that the media item is configured to present as many advertisements as the portion is configured to request from the advertisement distributor. The advertisement can be selected based on at least the first content according to a definition made by the publisher, and evaluating the parameter can include determining whether the definition is consistent. The method can further include generating a communication to the publisher regarding the media item based on evaluating the parameter. Evaluating the parameter can include determining, over time, whether a place in the media item where the second content is presented changes. The portion can include code and evaluating the parameter can include determining whether the code is consistent. The method can further include presenting a view of the media item to a user, the view comprising at least one feature added based on evaluating the portion. The method can further include identifying plurality of portions in the media item, the plurality of portions being associated with a ranking order of relevance to the media item; wherein the feature includes an indicator of the ranking order for each of the plurality of portions. The method can further include implementing an extension to a browser program, the extension configured to perform the identification of the first content, the identification of the portion and the evaluation of the parameter; and generating the view of the media item using the browser program and the extension. The method can further include implementing a script in association with a browser program, the script configured to perform the identification of the first content, the identification of the portion and the evaluation of the parameter; and generating the view of the media item using the browser program and the script. Identifying the portion can include determining that the portion matches a predefined pattern for code.

In a second aspect, a computer program product is tangibly embodied in a computer-readable medium, the computer program product including instructions that, when executed, generate on a display device a graphical user interface for analyzing content to be presented. The graphical user interface includes a media content area presenting a media item, the media item generated using first content including a portion configured to obtain second content for presentation in the media item, the portion identified as matching a predefined pattern. The graphical user interface includes a feature that is not defined by the first content and that the graphical user interface adds to the media item in the media content area, the feature displayed in association with the portion and indicating that a parameter associated with the portion has been evaluated.

In a third aspect, a computer-implemented method for analyzing a media item to be presented together with at least one advertisement includes identifying, in a viewer program, a media item configured to be presented on behalf of a publisher. The method includes identifying a portion of the media item as being configured to obtain at least one advertisement from an advertisement distributor for presentation in the media item according to an agreement between the publisher and the advertisement distributor, the portion identified as matching a predefined pattern for code. The method includes evaluating at least one parameter associated with the identified portion. The method includes displaying a view of the media item in the viewer program to a user involved in examining the media item, the view comprising at least one feature that is not defined by the media item and that is added based on evaluating the portion.

Implementations can provide any, all or none of the following advantages. Pages or other resources configured for requesting content such as advertisements can be evaluated. Content-requesting code can be evaluated efficiently. A useful display illustrating one or more aspects of a page to be published can be shown to a user for evaluation. Software can be provided that detects elements on a page and highlights them to make them more visible, and/or provides information about them in a report. Implementations can make it easier for a user to detect certain kinds of page elements and identify their location on a page.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
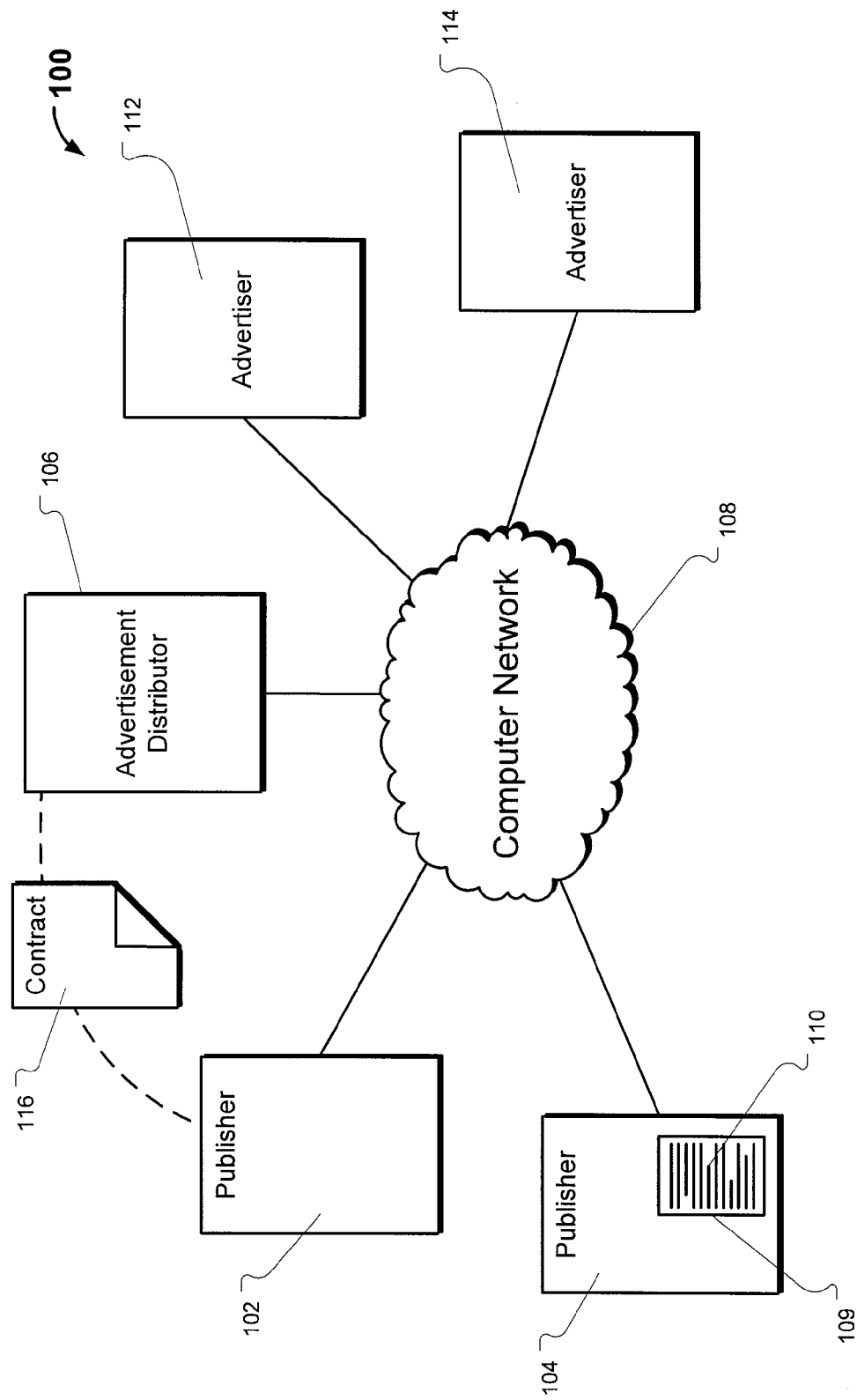
FIG. 1 shows an example of a network for delivering content such as advertisements.

FIG. 1 shows an example system 100 for delivering content such as media items or electronic pages enhanced with other content such as advertisements. The system 100 includes a plurality of publisher systems that publish content, including a publisher system 102 and a publisher system 104. In some implementations, the content published by the publisher systems can take the form of webpages. In some implementations, the content published by the publisher systems can take other forms, such as streaming audio, streaming video, text message updates sent to mobile devices, or other digital media. The content published by the publisher systems can include advertisements. For example, a media item published by the publisher system 102 can be configured so that one or more advertisements appear together with the media item contents upon publication. Below will be described examples of how a parameter relating to publication of the advertisement or other content can be obtained and analyzed.

The system 100 can include an advertisement distributor system 106. The advertisement distributor system 106 can provide content to an end user system for presenting content published by the publisher system 102 or the publisher system 104 via a computer network 108. The computer network 108 can be the Internet, an internal LAN, or any other computer network. The content provided by the advertisement distributor system 106 can be incorporated with the content published by the publisher systems at the user's system or elsewhere. In some implementations, the content provided by the advertisement distributor system 106 can take the form of one or more advertisements. For example, the publisher system 104 can publish content configured to, when loaded at the user's system, receive an advertisement from the advertisement distributor system 106 and incorporate the advertisement into a webpage.

A webpage 109 published by or associated with one of the publisher systems can include advertisement request code 110 for requesting an advertisement from the advertisement distributor system 106. The advertisement request code 110 can be included in the code for a webpage. The advertisement request code 110 can request an advertisement from the advertisement distributor system 106 when the webpage 109 is presented in an end user system, to name one example. The advertisement request code 110 can include a standard portion that is the same or similar for all advertisement requests. The standard portion can include code for specifying that content from the advertisement distributor system 106 is required. The standard portion can also include code for defining one or more other parameters for the display of an advertisement received from advertisement distributor system 106, such as position on the webpage 109, or size of the advertisement. The standard portion can also include code that identifies the advertisement request code 110 as code for requesting and presenting an advertisement.

In some implementations, the advertisement request code 110 can request an advertisement that relates to the subject matter of the webpage 109. For example, if the main content of the webpage 109 is an article about fly fishing, the advertisement request code 110 when executed can request advertisements that relate to fishing, camping, or other outdoor recreational activities. In another example, the webpage 109 can contain information about tourist sites in New York. The advertisement request code 110 can request advertisements that relate to tourist sites, hotels, or restaurants in New York. In some implementations, the advertisement request code 110 can indicate one or more keywords associated with the content of the webpage 109 when making a request for advertisements. The advertisement distributor system 106 can then use the one or more keywords to select advertisements that can be provided to an end user system that is displaying the webpage 109. In some implementations, the advertisement request code 110 can indicate a portion of the webpage 109 as the main content of the webpage 109. The advertisement distributor system 106 can then provide advertisements related to the indicated main content.

The advertisement request code 110 can be characterized by one or more parameters that determine some aspect of how a requested advertisement will be presented. For example, the advertisement request code 110 can define a height and a width of an advertisement. In another example, the advertisement request code 110 can define a position on the webpage 109 for an advertisement. In another example, the advertisement request code 110 can define a ranked order for advertisements on a webpage. In another example, the advertisement request code 110 can define a color and font for text included in an advertisement. In some implementations, the parameters included in the advertisement request code 110 can be evaluated. For example, the height and width of an advertisement, as defined by the advertisement request code 110, can be evaluated to ensure that they are within an acceptable range. In another example, the order of advertisements on a webpage can be evaluated to ensure that the advertisements are in a correct order based on a ranking system.

In some implementations, once the advertisement request code 110 has made a request for an advertisement, the requested advertisement can be received from the advertisement distributor system 106 via the computer network 108. The received advertisement or other content can then be presented as a portion of a webpage 109. The advertisement can be positioned on the webpage according 109 to one or more parameters specified by the advertisement request code 110. In addition, the size, font, color scheme and/or other parameters of the advertisement can be defined by the advertisement request code 110. A user viewing the webpage 109 can select the advertisement to be redirected to a website of an advertiser associated with the advertisement, such as a page from an advertiser system 112 or 114.

A contract 116 can exist between the advertisement distributor system 106 and one of the publisher systems, such as the publisher system 102. The contract 116 can include details relating to how advertisements or other content are to be presented on webpages published by the publisher system 102, and compensation for the publication. The contract 116 can define specific parameters for advertisements, or ranges of parameters for advertisements. Parameters required by the contract 116 for presenting advertisements can include position on the webpage, height and width, font, color, order of advertisements, number of advertisements, and highlighting. For example, the contract 116 can require that all text in advertisements presented in media items published by the publisher system 102 must be displayed with an Arial font within a size range of 10 points to 14 points. In another example, the contract 116 can require that advertisements that are provided by the advertisement distributor system 106 that have ranking scores must be presented in order based on their ranking scores. In another example, the contract 116 can require that all advertisements must be positioned at a given location, such as above the main content of a media item.

The advertisement distributor system 106 can evaluate media items published by the publisher system 102, e.g. to ensure that parameters of advertisements included in the media items published by the publisher system 102 are in accordance with the contract 116. For example, the advertisement distributor system 106 can evaluate the code for requesting advertisements for a webpage to ensure that the font of the advertisement text and order of the advertisements is in accordance with the requirements defined by the contract 116. In some implementations, the advertiser 112 and the advertiser 114 can evaluate the parameters of their advertisements that are included in media items published by the publisher system 102 or the publisher system 104. An outcome of such evaluation can be used in managing relationships between the advertisement distributor and one or more publishers, for example in an effort to maintain or increase publication quality.

Figure 2:
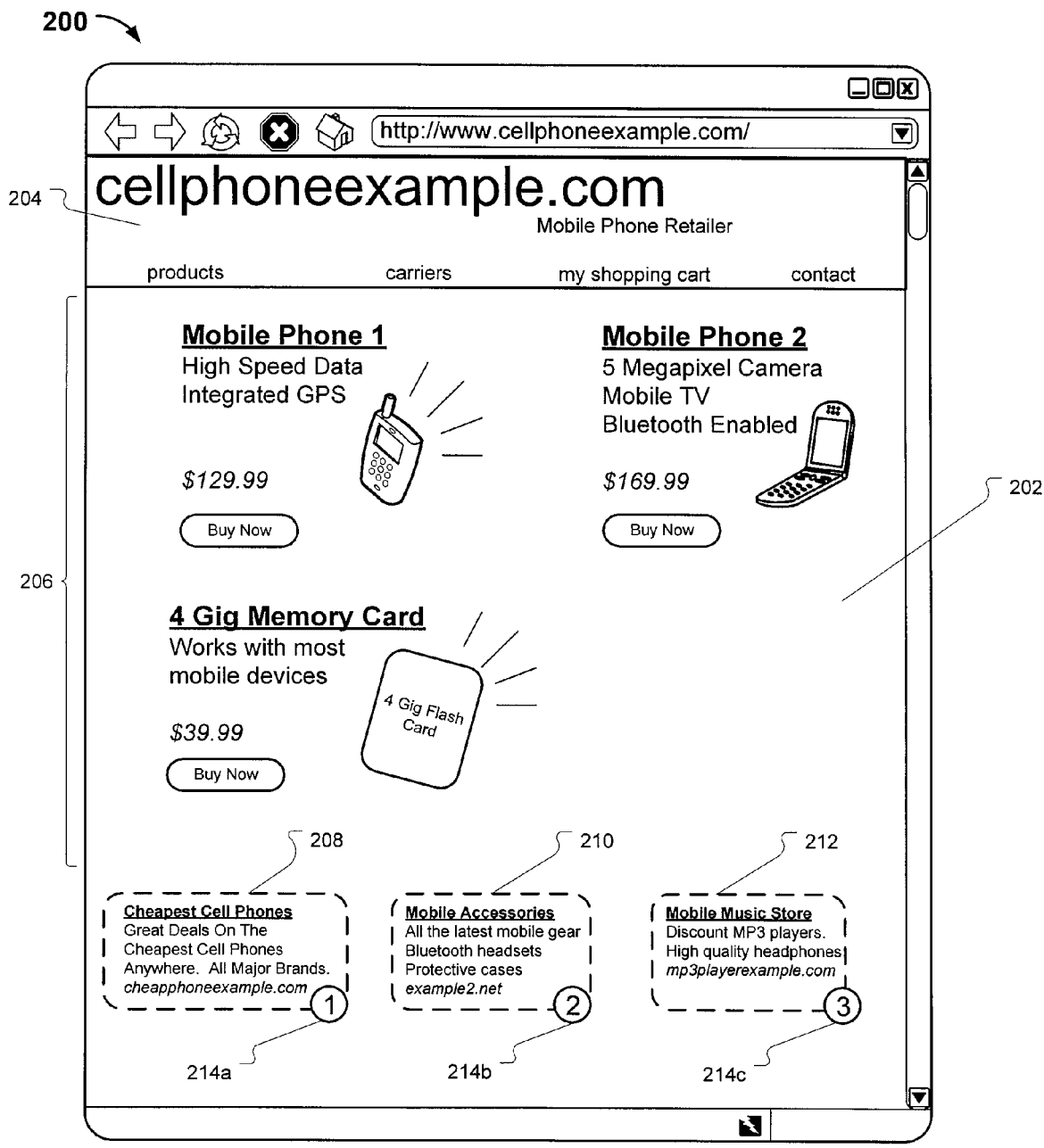
FIG. 2 shows an example of a visual display containing a viewer.

FIG. 2 shows a viewer 200 which in this example displays a webpage 202 for an on-line cell phone retailer. The webpage 202 can include a header 204 which displays a title for the webpage 202 and includes navigation buttons for navigating to other webpages contained in a website that includes the webpage 202. The webpage 202 can include main content 206. In the example depicted, the main content 206 displays information about several products that can be purchased from the webpage 202. The webpage 202 can further include one or more portions of other content, such as advertisements, in this example advertisements 208, 210, and 212.

Code for presenting the webpage 202 can include advertisement request code, such as the advertisement request code 110 from FIG. 1, for requesting advertisements from an advertisement distributor system. The code for the webpage 202 can include one or more segments of advertisement request code. For example, the code for the webpage 202 can include a separate segment of advertisement request code for each advertisement that is to be presented on the webpage 202. The advertisement request code can identify a portion of the webpage 202 that can be used to identify what type of advertisements should be presented on the webpage 202. For example, the advertisement request code can identify the main content 206 as containing content that defines the main subject matter of the webpage 202. Advertisements related to keywords or text included in the main content 206 can then be requested by the advertisement request code and presented as part of the webpage 202.

For example, in the example depicted, the webpage 202 is part of an on-line cell phone retailer website. The advertisement request code can identify the main content 206 as containing text and subject matter to which requested advertisements should be related. Advertisements relating to cell phones or technology can then be requested and presented as part of the webpage 202. For example, the advertisement 208 is an advertisement for another on-line cell phone retailer. In another example, the advertisement 210 is an advertisement for mobile phone accessories. In another example, the advertisement 212 is an advertisement for an on-line retailer that sells mp3 players and headphones. While mobile music devices and accessories are different from cell phones, it can be determined by an advertisement distributor system that a user viewing a webpage related to cell phones may be interested in purchasing mp3 players or headphones.

After one or more advertisements have been requested by one or more segments of advertisement request code, the requested advertisements 208, 210, and 212 can be presented as part of the webpage 202. An advertisement distributor system that provided the advertisements 208, 210, and 212 or a third party can use identification software to identify the advertisements 208, 210, and 212 or other content and parameters associated with the advertisements. For simplicity, such software will hereafter be referred to as "advertisement identification software," with the understanding that also or instead other content can be identified.

The advertisements 208, 210, and 212 can be identified based on patterns in the one or more segments of advertisement request code that are the same or similar for all advertisement requests. For example, each individual segment of advertisement request code can include a standard portion that makes a call to an advertisement distributor system. This standard portion can be identified for each segment of advertisement request code so that the advertisement request code can be identified as advertisement request code by the advertisement identification software. For example, advertisement request code can resemble the following segment of code:

```
<script language="JavaScript">
<!--
            google_ad_client = 'ca-haymarketgroup';
            google_ad_channel = 'pistonheads';
            google_ad_output = 'js';
            google_ad_section = 'default';
            google_adtest = 'off';
            google_ad_type = 'text,image';
            google_encoding = 'utf8';
            google_max_num_ads = '3';
            google_safe = 'high';
            google_image_size = '468x60';
// -->
</script>
<script language="JavaScript"
src="http://pagead2.googlesyndication.com/pagead/show_ads.js">
```

In the example segment of code, the portions of code to the left of each "=" symbol can be recognized as standard portions of code. For example, variables such as "google_ad_client" and "google_ad_channel" can be included in every segment of advertisement request code. When these variables appear in a segment of code, this can indicate that the segment of code is advertisement request code.

The advertisement identification software can identify one or more parameters associated with each of the advertisements 208, 210, and 212. Parameters can include, but are not limited to, position on the webpage 202, height and width, number of advertisements on the webpage 202, color, font, text size, highlighting, and order of the advertisements 208, 210, and 212. For example, in the example segment of advertisement request code shown above, the variable "google_max_num_ads" is set to "3" to specify that a maximum of 3 advertisements should be displayed on the webpage 202. In another example, the example segment of code shown above sets the variable "google_image_size" to "468x60". This specifies that each advertisement should be displayed at a size of 468 pixels by 60 pixels. In another example, the example segment of code shown above sets the variable "google_ad_ type" to "text, image". This specifies that each advertisement should be displayed as a combination of text and images.

In another example, advertisement request code can specify that each advertisement should be between 100 and 250 pixels in height and 100 and 300 pixels in width. In another example, advertisement request code can specify that the requested advertisements are to be presented in a specific order based on a ranking score assigned to each advertisement by an advertisement distributor system. In another example, advertisement request code can specify that text in the advertisements 208, 210, and 212 should be displayed in Ariel font at a size of 8 points.

In some implementations, the advertisement identification software can identify parameters in the advertisement request code based on standard variable names. For example, referring to the example code segment shown above, the advertisement identification software can identify that the variable "google_image_size" defines the size of each advertisement, that the variable "google_max_num_ads" defines the number of advertisements to present, and that the variable "google_ad_client" identifies a client that is requesting the advertisements.

The advertisement identification software can evaluate if the parameters associated with the advertisements are in accordance with a contract between the advertisement distributor system and the publisher of the webpage 202, such as the contract 116 from FIG. 1. For example, the advertisement identification software can evaluate whether the text of the advertisements 208, 210, and 212 is the correct font and size as required by the contract. In another example, the advertisement identification software can evaluate whether the advertisements 208, 210, and 212 are in the correct order as required by the contract. In another example, the advertisement identification software can determine if the correct portions of the advertisements 208, 210, and 212 are highlighted as required by the contract.

In some implementations, the advertisement identification software can evaluate the advertisement request code to verify that the code is formatted correctly and that all necessary variables are present and defined. For example, referring to the example code segment shown above, the advertisement identification software can verify that all of the required variables for a segment of advertisement request code are present in the example code segment and that all of the variables have correctly assigned values. For example, the advertisement identification software can verify that the variable "google_max_num_ads" is assigned a value that is a positive integer.

In some implementations, a user can visually analyze the parameters the advertisements 208, 210, and 212 to insure that they are in accordance with a contract. The advertisement identification software can identify and visually display parameters associated with each of the advertisements 208, 210, and 212. For example, referring to the example code segment shown above, the advertisement identification software can display the size of each advertisement as "468×60" somewhere in proximity to each advertisement. This can allow a user to verify that size of the advertisements is in accordance with the contract. In another example, referring to FIG. 2, the advertisements 208, 210, and 212 are identified as advertisements by dashed lines. This allows a user to visually analyze the advertisements 208, 210, and 212 and ascertain if they appear to have the correct size. Identifying advertisements by dashed lines also allows a user to verify that the advertisements are in the proper position in relation to the webpage 202, i.e. above, below, or to the side of the main content of the webpage.

In another example, the advertisement identification software can display a ranking number 214 for each advertisement. FIG. 2 shows that the advertisements 208, 210, and 212 are placed in the correct order on the screen based on their ranking numbers 214, with advertisement 208 having a ranking number 214a of "1"; advertisement 210 having a ranking number 214b of "2"; and advertisement 212 having a ranking number 214c of "3". In another example, the advertisements may not be in the correct order according to their ranking numbers 214. The advertisement identification software can display the ranking numbers 214 so that the user can quickly identify that the advertisements are not in the correct order. In another example, the advertisement identification software can display the font and size of text in each of the advertisements 208, 210, and 212 in proximity to each advertisement. This can allow the user to easily determine if the text font and size is in accordance with the contract. In another example, the advertisement identification software can display the total number of advertisements requested by the advertisement request code. The user can then visually verify if the correct number of advertisements are presented on the webpage 202.

One or more webpages for a publisher can be analyzed when a publisher page is first published—e.g., when its advertisement request code begins receiving advertising content from an advertisement distributor system. The webpages or other content can be analyzed to ensure that advertisement request code provided by the advertisement distributor system and included in webpages published by the publisher is formatted and executed correctly. The webpages can also be analyzed to ensure that parameters associated with advertisements presented on the webpages are in accordance with a contract between the publisher and advertisement distributor system. In some implementations, webpages can be analyzed before they are published by the publisher to ensure that the webpages are displayed correctly before they are presented to end users. For example, a publisher can create one or more example webpages that include advertisement request code so that an advertisement distributor system for the advertisements can analyze the webpages and verify that the advertisements are displayed correctly.

In some implementations, webpages can be periodically analyzed to ensure that displayed advertisements are still in accordance with the contract over given periods of time. This allows the advertisement distributor system to ascertain if advertisements are being displayed incorrectly due to changes in the code or layout of webpages since the previous time the webpages had been analyzed.

Thus, parameters and code associated with advertisements on a webpage can be analyzed, either automatically by advertisement identification software, or manually by a user with the assistance of advertisement identification software, to name a few examples. If the parameters and/or advertisement request code of the webpage need to be modified, for example because they are not in accordance with a contract, a communication directed to the publisher can be generated and sent to identify problems with the advertisements. For example, if advertisement request code for a webpage indicates that 4 advertisements should be presented, but only 3 advertisements are in fact presented, a communication detailing the problem can be sent to the publisher of the webpage. In another example, if advertisements presented on a webpage are not placed in the correct order according to their ranking numbers, a communication detailing the problem can be sent to the publisher of the webpage.

Figure 3A:
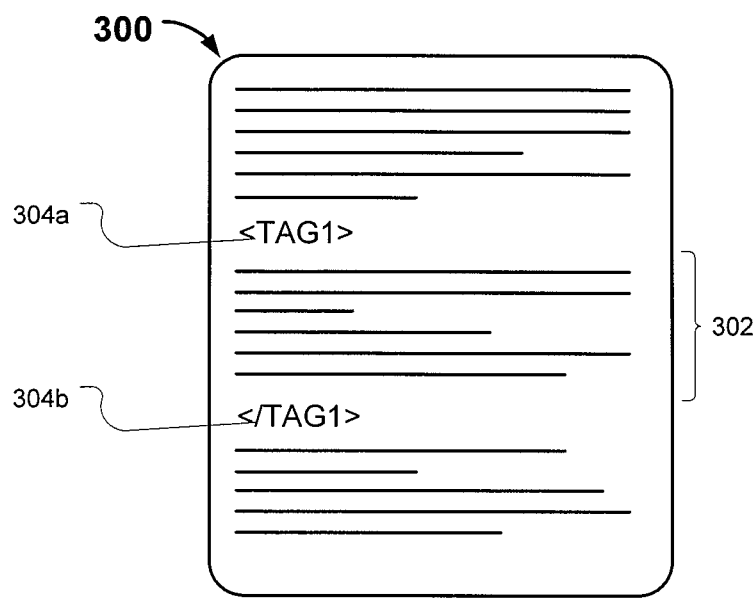
FIG. 3A shows an example of a code segment.

FIG. 3A shows an example of a code segment 300 for presenting a media item, such as the webpage 202 from FIG. 2. The code segment 300 can correspond to content that is displayed as part of the media item when the code is executed. A portion 302 of the content can be identified using tags 304. A first tag 304a or other marker can be used to identify the beginning of the portion 302 and a second tag 304b or other marker can be used to identify the end of the portion 302. In some implementations, the publisher places the tags/markers to define which content of the code segment 300 is to serve as a basis for matching advertisements or other content with the resulting media item.

Advertisement request code within the code segment 300 can identify the portion 302 as being the main content of the media item, or especially relevant to what types of advertisements should be presented in the media item. For example, if the media item includes a news article, the portion 302 can be the title and main body of the article, with the rest of the content of the media item, such as navigation menus, links to other articles, etc., not included in the portion 302. In another example, if the media item displays a medical journal article, the tags 304 can identify the portion 302 as the abstract of the article since the abstract can contain enough relevant information about the content of the article for selecting relevant advertisements. In another example, a publisher of the media item can determine that a particular portion of the content of the media item is relevant to advertisement selection and identify it as the portion 302 using the tags 304.

Advertisements relating to the portion 302 can be provided in response to the advertisement request code and presented as part of the media item. Advertisement identification software can identify the portion 302 that is set between the tags 304. In some implementations, the advertisement identification software can analyze the portion 302 and the rest of the content of the media item to determine if the portion 302 is actually representative of the main content of the media item. For example, the advertisement identification software can determine if the majority of text displayed on the media item is contained within the portion 302. If the majority of the text is contained within the portion 302, and the rest of the content displayed on the media item is mostly images and links, the advertisement identification software can determine that the portion 302 is representative of the main content of the media item. In another example, the advertisement identification software can parse the portion 302 for keywords and compare them to keywords extracted from the rest of the content of the media item to determine if the portion 302 is representative of the main content of the media item. The advertisement identification software can also identify advertisements displayed on the media item and determine if the subject matter of the advertisements is relevant to the subject matter of the portion 302.

In some implementations, the advertisement identification software can insert visual identifiers onto the media item to indicate where the tag 304a and the tag 304b are located within the content of the media item. A user can then visually analyze the content between the tags 304 and the rest of the content of the media item to determine if the portion 302 contained between the tags 304 is representative of the main content of the media item. The user can also analyze one or more advertisements displayed on the media item and determine if the subject matter of the advertisements is relevant to the subject matter of the portion 302.

In some implementations, if the identified section is determined to not be the main content of the media item, the publisher of the media item can be contacted so that the tags can be corrected. For example, advertisement identification software can visually display the location of the tags 304 on the media item. The user can then analyze the portion 302 between the tags 304 to determine that the portion 302 is a navigation menu and not the main content of the media item. The user can then contact the publisher of the media item and identify the problem so that the tags 304 can be corrected. In another example, the advertisement identification software can determine that the portion 302 is composed entirely of images and is not useful for extracting keywords to relate to advertisements. The advertisement identification software can for example generate an e-mail detailing the problem and send the e-mail to the publisher of the media item.

Figure 3B:
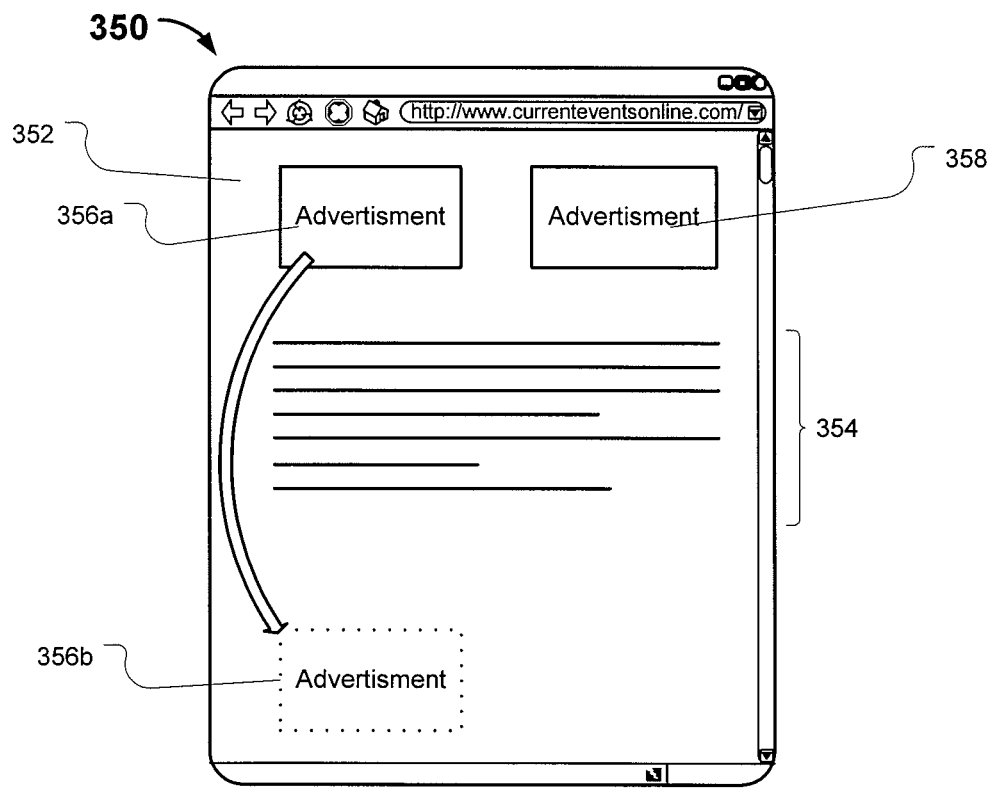
FIG. 3B shows an example of a visual display containing a viewer in which a portion of the content presented in the viewer has been moved.

FIG. 3B shows a viewer 350 displaying a webpage 352. The webpage 352 can include main content 354, an advertisement 356a, and an advertisement 358. The webpage 352 can be analyzed using advertisement identification software when the webpage 352 is first published. The advertisement identification software can identify that parameters associated with the advertisement 356a and the advertisement 358 are acceptable, for example because the published page appears to be in accordance with a contract between the publisher of the webpage 352 and an advertisement distributor system that provides the advertisements. The advertisement identification software can also identify the location on the webpage 352 of the advertisements 356a and 358. In the example shown, the advertisements 356a and 358 are displayed at the top of the webpage 352. As noted, in this example the top of the page is the proper location for the advertisements 356a and 358.

The advertisement identification software can then analyze the webpage 352 at a later date. The advertisement identification software can identify that the advertisement 356a has been moved to a location 356b. In some implementations, the advertisement identification software can automatically identify that the advertisement 356a has been moved by comparing the location of the advertisement 356a from the first analysis to the location of the advertisement 356a during the second analysis. In some implementations, the advertisement identification software can visually identify the original location of the advertisement 356a and the location 356b so that a user can easily identify that the advertisement 356a has been moved.

It can then be determined, either by the advertisement identification software or the user, if the location 356b is an equivalent location to the original location of the advertisement 356a or an inferior location to the original location of the advertisement 356a. It can also be determined if the location 356b is in accordance with a contract between the publisher of the webpage 352 and advertisement distributor system that provides the advertisement 356a. If it is determined that the location 356b does not satisfy requirements of the contract as to the location of the advertisement 356a, the publisher of the webpage 352 can be contacted so that the problem can be corrected.

In some implementations, changes to other parameters associated with the advertisements 356a and 358 can be also be monitored. Other parameters that can be monitored for changes include height, width, text size, font, color, and advertisement order. For example, when the webpage 352 is first analyzed, it can be determined that the advertisements presented on the webpage 352 are in the correct order based on ranking numbers assigned to each advertisement. when the webpage 352 is analyzed at a later date, it can be determined that the advertisements are no longer presented in the correct order. An e-mail to the publisher of the webpage outlining the problem can then be generated and sent so that the problem can be corrected.

Figure 4:
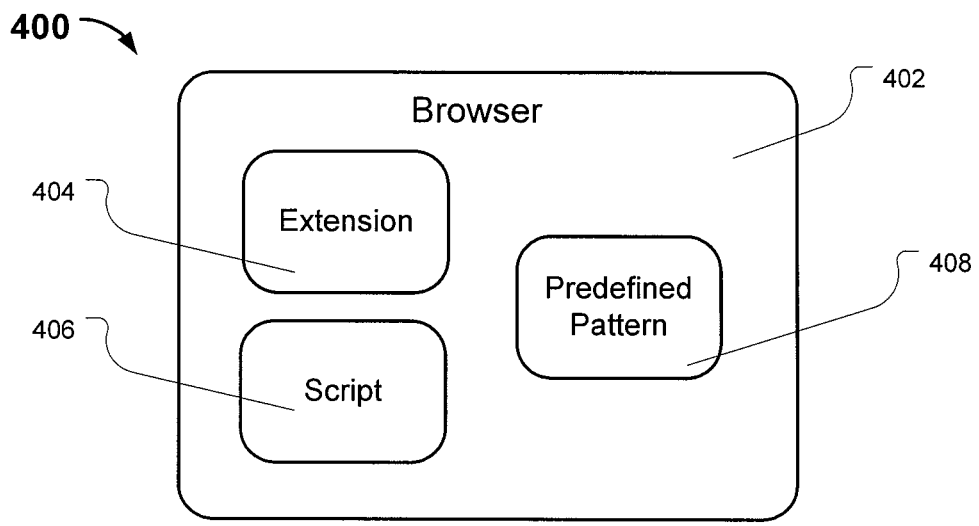
FIG. 4 shows an example of a browser that includes a browser extension or script for identifying predefined patterns in content.

FIG. 4 shows a system 400 that includes a browser 402. In some implementations the browser 402 can include an extension 404 that is capable of identifying advertisements and parameters associated with advertisements on a webpage or other media. That is, in such examples the browser 402 can be a commonly available browser and the extension 404 can be provided to configure the browser for performing evaluation of parameters relating to how content such as advertisements is presented on one or more publisher media items.

The extension 404 can include advertisement identification software, such as the advertisement identification software described above with reference to FIG. 2. The extension 404 can be used to identify advertisements on a webpage presented by the browser 402 and visually display parameters associated with the advertisements. The extension 404 can also be used to analyze whether parameters associated with the advertisements are in accordance with a contract between a publisher of the webpage and an advertisement distributor system that provides the advertisements.

In some implementations the browser 402 can execute a script 406 that is capable of identifying advertisements and parameters associated with advertisements on a webpage or other media. The script 406 can be implemented using a scripting language associated with the browser 402, or using a general programming language. For example, the browser 402 can be the commonly available Firefox browser and the script 406 can be written using the GreaseMonkey feature compatible with that browser.

The script 406 can include advertisement identification software, such as the advertisement identification software described above with reference to FIG. 2. The script 406 can be used to identify advertisements on a webpage presented by the browser 402 and visually display parameters associated with the advertisements. The script 406 can also be used to analyze whether parameters associated with the advertisements are in accordance with a contract between a publisher of the webpage and an advertisement distributor system that provides the advertisements.

The extension 404 or the script 406 can identify advertisements or advertisement request code within the code for a webpage presented by the browser 402 by identifying a predefined pattern 408 in the code. In some implementations, there can be a plurality of predefined patterns 408 that can be used to identify advertisements or advertisement request code within the code for a webpage presented by the browser 402. For example, all segments of advertisement request code may share a common header indicating that they are advertisement requests. In another example, all segments of advertisement request code may share a common set of variables. When one or more of these variables are identified by the extension 404 or the script 406, the segment of code that contains the one or more variables can be identified as advertisement request code.

In some implementations, depending on the capabilities of the browser 402, the extension 404 and the script 406 may have different access to code and parameters associated with an advertisement. For example, the extension 404 and the script 406 may have different access to webpage code that is used to present a webpage on the browser 402. In another example, the extension 404 and the script 406 may have different capabilities for accessing advertisement request code.

Figure 5:
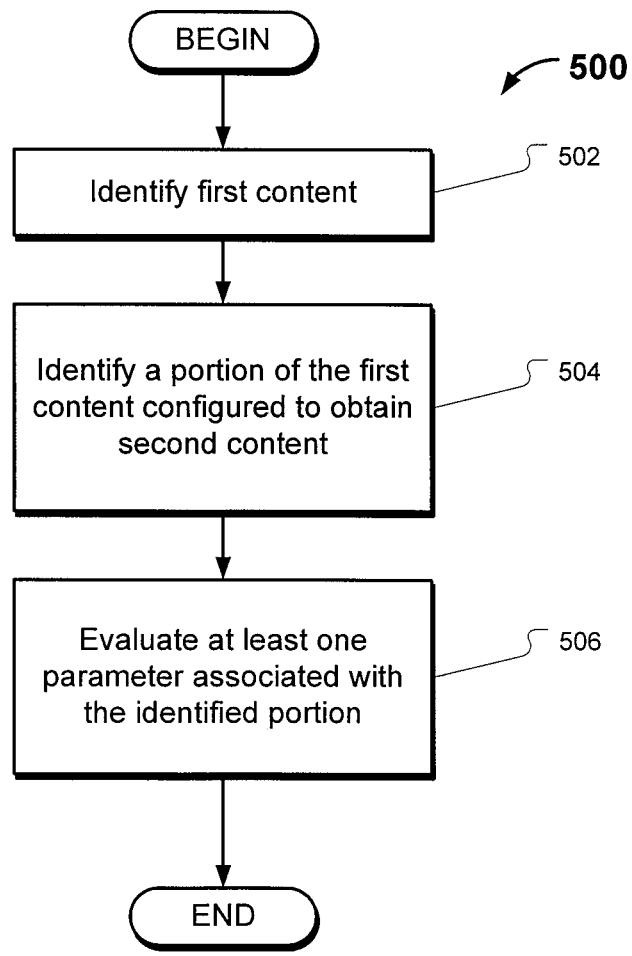
FIG. 5 shows an example of a flowchart of a method for evaluating a parameter associated with content such as an advertisement.

FIG. 5 shows a flowchart of a method 500 for evaluating a parameter associated with an advertisement. In some implementations, the method 500 can be performed by a processor executing instructions stored in a computer-readable medium, such as in the system 100 from FIG. 1. In some implementations, the method 500 can be implemented in association with a viewer, such as the viewer 200 from FIG. 2.

Step 502 identifies first content for generating a media item. In some implementations, the media item can be a webpage, such as the webpage 202 from FIG. 2. The first content can be computer code for generating the media item. For example, the first content can be HTML code or javascript for generating a webpage.

Step 504 identifies a portion of the first content configured to obtain second content. For example, the portion can be advertisement request code configured to obtain one or more advertisements, such as the advertisement request code 110 from FIG. 1. In some implementations, the portion can be configured to request secondary content that is not advertising content to include with the main content of the media item. For example, if the media item is a webpage containing an article, the portion can be configured to obtain secondary content containing information about the author of the article that can be presented as a sidebar on the webpage. In another example in which the media item is a webpage containing an article, the portion can be configured to obtain summaries of other related articles. The summaries can then be presented as part of the webpage.

In some implementations, the portion can be identified using advertisement identification software, such as the advertisement identification software from the description of FIG. 2. The portion can be identified based on one or more standard segments of code included in the portion. For example, a standard header indicating that the portion is advertisement request code may be included in all advertisement request code. In another example, the portion may contain one or more standard variables that are included in every portion configured to request secondary content.

Step 506 evaluates at least one parameter associated with the identified portion. In some implementations, the parameters can be evaluated for accordance with defined requirements. For example, the font size of secondary content obtained by the portion can be evaluated to ensure that the font size is in accordance with a defined requirement. In another example, the position in the media item of an advertisement obtained by the portion can be evaluated to ensure that the position is in accordance with a defined requirement. in another example, the order of advertisements obtained by the portion can be evaluated to ensure that the advertisements are in the correct order based on a ranking score or ranking number assigned to each advertisement.

In some implementations, more or fewer steps can be performed. As another example, one or more steps can be performed in a different order.

Figure 6:
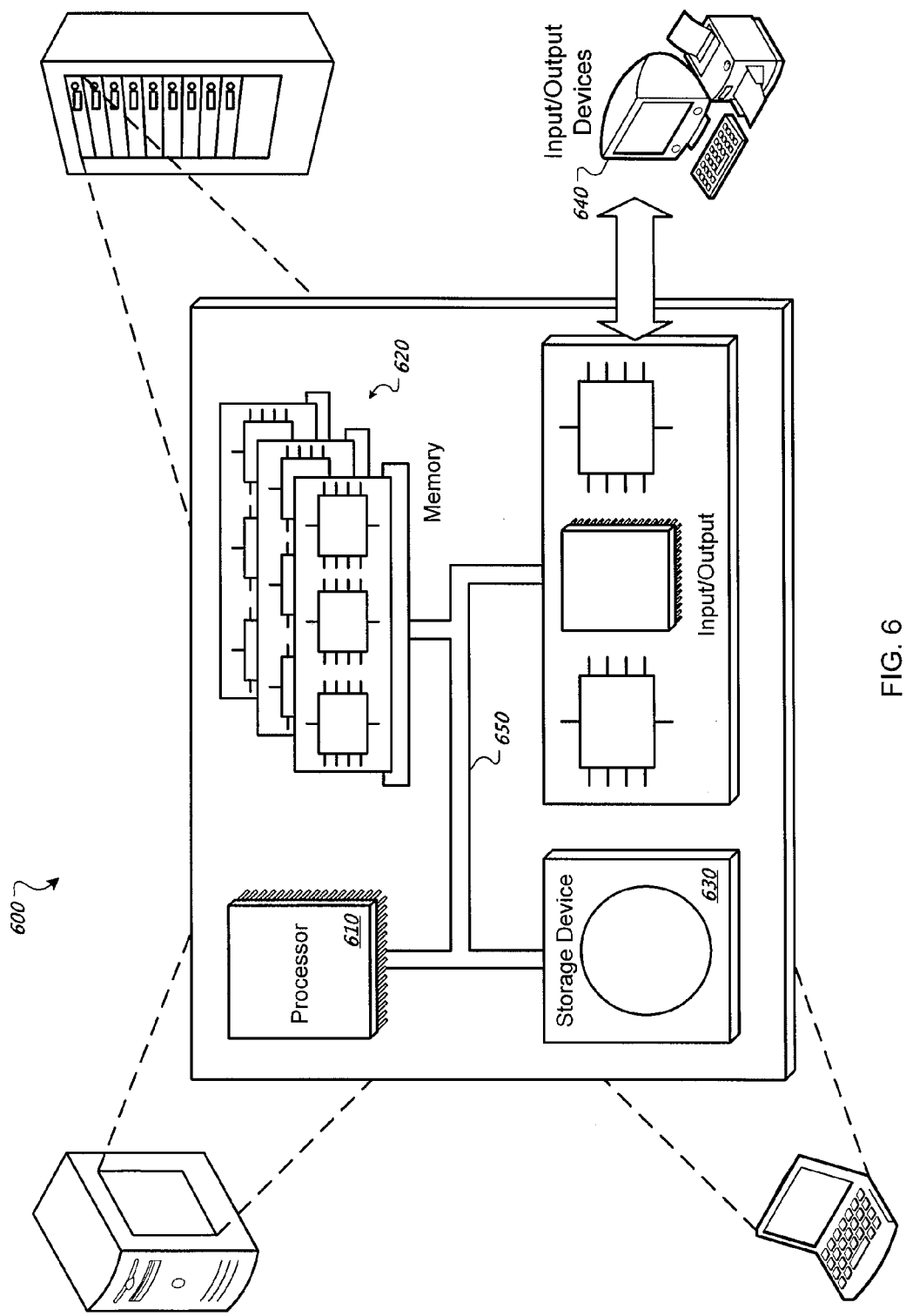
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for analyzing content to be displayed to end users, the method comprising:
   receiving first content configured for generating a media item;
   identifying a portion of the received first content as being configured to obtain second content for presentation on the media item, wherein the portion is configured for requesting the second content from an advertisement distributor, the second content including at least one advertisement, and wherein a publisher places the second content in the first content according to an agreement between the publisher and the advertisement distributor wherein the agreement includes a plurality of contractual parameters descriptive of the placement of the second content when presented to end users;
   receiving the second content and the plurality of contractual parameters;
   after receiving the first content and the second content, evaluating at least one parameter of the plurality of contractual parameters associated with the identified portion, including determining whether the presentation of the at least one advertisement in the media item reflects the contractual parameter; and
   presenting a view of the media item to a user wherein the user is associated with the advertisement distributor and is not an end user, the view comprising: the media item, the second content including the at least one advertisement, and at least one visual display parameter based on the determining that presents an indicator, on the view and in addition to the second content, of a value associated with the at least one parameter defined in the agreement, such that the user can confirm satisfaction of the agreement based on the presenting.

2. The computer-implemented method of claim 1, wherein evaluating the parameter comprises determining whether the media item conforms to the agreement.

3. The computer-implemented method of claim 1, wherein evaluating the parameter comprises determining that the media item is configured to present as many advertisements as the portion is configured to request from the advertisement distributor.

4. The computer-implemented method of claim 1, wherein the advertisement is selected based on at least the first content according to a definition made by the publisher, and wherein evaluating the parameter comprises determining whether the definition is consistent.

5. The computer-implemented method of claim 1, further comprising:
generating a communication to the publisher regarding the media item based on evaluating the parameter.

6. The computer-implemented method of claim 1, wherein evaluating the parameter comprises determining, over time, whether a place in the media item where the second content is presented changes.

7. The computer-implemented method of claim 1, wherein the portion includes code and wherein evaluating the parameter comprises determining whether the code is consistent.

8. The computer-implemented method of claim 1, wherein the visual display parameter includes, for each of the advertisements, a visual ranking indicator of the ranking order for that advertisement.

9. The computer-implemented method of claim 1, further comprising:
implementing an extension to a browser program, the extension configured to perform the identification of the first content, the identification of the portion and the evaluation of the parameter; and
generating the view of the media item using the browser program and the extension.

10. The computer-implemented method of claim 1, further comprising:
implementing a script in association with a browser program, the script configured to perform the identification of the first content, the identification of the portion and the evaluation of the parameter; and
generating the view of the media item using the browser program and the script.

11. The computer-implemented method of claim 1, wherein identifying the portion comprises:
determining that the portion matches a predefined pattern for code.

12. A computer program product tangibly embodied in a non-transitory computer-readable medium, the computer program product including instructions that, when executed, perform operations comprising:
receiving first content configured for generating a media item;
identifying a portion of the received first content as being configured to obtain second content for presentation on the media item, wherein the portion is configured for requesting the second content from an advertisement distributor, the second content including at least one advertisement, and wherein a publisher places the portion in the first content according to an agreement between the publisher and the advertisement distributor wherein the agreement includes a plurality of contractual parameters;
receiving the second content and the plurality of contractual parameters;
after receiving the first content and the second content, evaluating at least one parameter of the plurality of contractual parameters associated with the identified portion, including determining whether the presentation of the plurality of advertisements in the media item reflects the contractual parameter; and
presenting a view of the media item to a user, the view comprising: the media item, the second content including the at least one advertisement, and at least one visual display parameter that presents an indicator, on the view and in addition to the second content, of a value associated with the at least one parameter defined in the agreement.

13. A computer-implemented method for analyzing a media item to be presented together with at least one advertisement to end users, the method comprising:
identifying, in a viewer program, a media item configured to be presented to end users on behalf of a publisher;
identifying a portion of the media item as being configured to obtain at least one advertisement from an advertisement distributor for presentation in the media item when presented to end users according to an agreement between the publisher and the advertisement distributor, the portion identified as matching a predefined pattern for code;
receiving the identified portion of the media item, an advertisement, and a plurality of contractual parameters;
evaluating at least one of the received parameters associated with the received identified portion;
displaying a first view of the media item in the viewer program to end users, the view comprising: the media item and the advertisement; and
displaying a second view of the media item in the viewer program to a user associated with the advertisement distributor and who is not an end user, the view comprising: the media item, the advertisement, and at least one visual display parameter that is not defined by the media item or the advertisement and that is added based on evaluating the portion, wherein the visual display parameter is not visible in the first view, such that the user can confirm satisfaction of the agreement based on the presenting.

14. The computer-implemented method of claim 13, wherein multiple advertisements associated with a ranking order of relevance to the media item are displayed in the second view, and wherein the visual display parameter includes, for each of the advertisements, an alphanumeric visual ranking indicator of the ranking order for that advertisement.

15. The computer-implemented method of claim 13, wherein multiple advertisements associated with a ranking order of relevance to the media item are displayed in a media content area associated with viewer program, and wherein the visual display parameter includes, for each of the advertisements, an alphanumeric visual ranking indicator of the ranking order for that advertisement.

16. The computer-implemented method of claim 1 wherein the portion is configured to request a plurality of advertisements for presentation simultaneously in the media item, the plurality of advertisements being associated with a ranking order of relevance to the media item, and wherein the visual display parameter is of the form of an ordinal ranking number for a given advertisement.

17. The computer-implemented method of claim 1 wherein the portion is configured to request a plurality of advertisements for presentation simultaneously in the media item, each of the plurality of advertisements being associated with a font, and wherein the visual display parameter is of the form of a font and size of text for a given advertisement.

18. The computer-implemented method of claim 1 wherein the portion is configured to request a plurality of advertisements for presentation simultaneously in the media item, each of the plurality of advertisements being associated with a size, and wherein the visual display parameter is of the form of a textual size description for a given advertisement.

19. The computer-implemented method of claim 1 wherein the portion is configured to request a plurality of advertisements for presentation simultaneously in the media item, the plurality of advertisements being associated with a dimensional size and position of presentation within the media item, and wherein the visual display parameter is of the form of a plurality of lines arranged to identify the size and location for a given advertisement.

20. A system comprising:
a computer server device; and
a computer program product tangibly embodied in a computer-readable medium coupled to the computer server device, the computer program product including instructions that, when executed, cause the computer server device to perform operations comprising:
receiving first content configured for generating a media item;
identifying a portion of the received first content as being configured to obtain second content for presentation on the media item, wherein the portion is configured for requesting the second content from an advertisement distributor, the second content including at least one advertisement, and wherein a publisher places the second content in the first content according to an agreement between the publisher and the advertisement distributor wherein the agreement includes a plurality of contractual parameters descriptive of the placement of the second content when presented to end users;
receiving the second content and the plurality of contractual parameters;
after receiving the first content and the second content, evaluating at least one parameter of the plurality of contractual parameters associated with the identified portion, including determining whether the presentation of the at least one advertisement in the media item reflects the contractual parameter; and
providing the first content to a client device associated with the advertisement distributor and is not an end user, the first content comprising: the media item, the second content including the at least one advertisement, and at least one visual display parameter based on the determining that presents an indicator, on a view of the media item and in addition to the second content, of a value associated with the at least one parameter defined in the agreement such that the user can confirm satisfaction of the agreement based on the presenting.

21. The system of claim 20, wherein evaluating the parameter comprises determining whether the media item conforms to the agreement.

22. The system of claim 20, wherein evaluating the parameter comprises determining that the media item is configured to present as many advertisements as the portion is configured to request from the advertisement distributor.

23. The system of claim 20, wherein the advertisement is selected based on at least the first content according to a definition made by the publisher, and wherein evaluating the parameter comprises determining whether the definition is consistent.

24. The system of claim 20, the operations further comprising:
generating a communication to the publisher regarding the media item based on evaluating the parameter.

25. The system of claim 20, wherein evaluating the parameter comprises determining, over time, whether a place in the media item where the second content is presented changes.

26. The system of claim 20, wherein the portion includes code and wherein evaluating the parameter comprises determining whether the code is consistent.

27. The system of claim 20, wherein the visual display parameter includes, for each of the advertisements, a visual ranking indicator of the ranking order for that advertisement.

28. The system of claim 20, wherein identifying the portion comprises:
determining that the portion matches a predefined pattern for code.

29. A computer-implemented method for analyzing content to be displayed, the method comprising:
receiving first content configured for generating a media item;
identifying a portion of the received first content as being configured to obtain second content for presentation on the media item, wherein the portion is configured for requesting the second content from an advertisement distributor, the second content including at least one advertisement, and wherein a publisher places the second content in the first content according to a plurality of content display parameters descriptive of the placement of the second content when presented to end users;
receiving the second content and the plurality of content display parameters;
after receiving the first content and the second content, evaluating at least one parameter of the plurality of content display parameters associated with the identified portion, including determining whether the presentation of the at least one advertisement in the media item satisfies the at least one parameter; and
presenting a view of the media item to a user wherein the user is associated with the advertisement distributor and is not an end user, the view comprising: the media item, the second content including the at least one advertisement, and at least one visual display parameter based on the determining that presents an indicator, on the view and in addition to the second content, of a value associated with the at least one parameter defined by the content display parameters, such that the user can confirm presentation of the second content according to the content display parameters based on the presenting.

30. The computer-implemented method of claim 29, wherein evaluating the parameter comprises determining whether the media item conforms to the plurality of content display parameters.

31. The computer-implemented method of claim 29, wherein evaluating the parameter comprises determining that the media item is configured to present as many advertisements as the portion is configured to request from the advertisement distributor.

32. The computer-implemented method of claim 29, wherein the advertisement is selected based on at least in part on the first content according to a definition provided by the publisher, and wherein evaluating the parameter comprises determining whether the definition is consistent.

33. The computer-implemented method of claim 29, further comprising:
generating a communication to the publisher regarding the media item based on evaluating the at least one parameter.

34. The computer-implemented method of claim 29, wherein evaluating the parameter comprises determining, over time, whether a place, in the media item where the second content is presented, changes.

35. The computer-implemented method of claim 29, wherein the portion includes code and wherein evaluating the parameter comprises determining whether the code is consistent.

36. The computer-implemented method of claim 29, wherein the visual display parameter includes, for each of the advertisements, a visual ranking indicator of a ranking order for that advertisement.

37. The computer-implemented method of claim 29, further comprising:
    implementing an extension to a browser program, the extension configured to perform the identification of the first content, the identification of the portion and the evaluation of the parameter; and
    generating the view of the media item using the browser program and the extension.

38. The computer-implemented method of claim 29, further comprising:
    implementing a script in association with a browser program, the script configured to perform the identification of the first content, the identification of the portion and the evaluation of the parameter; and
    generating the view of the media item using the browser program and the script.

39. The computer-implemented method of claim 29, wherein identifying the portion comprises:
    determining that the portion matches a predefined pattern for code.

40. A computer-implemented method for analyzing content to be displayed to end users, the method comprising:
    receiving first content configured for generating a media item;
    identifying a portion of the received first content as being configured to obtain second content for presentation on the media item, wherein the portion is configured for requesting the second content from an advertisement distributor, the second content including at least one advertisement, and wherein a publisher places the second content in the first content according to an agreement between the publisher and the advertisement distributor wherein the agreement includes a plurality of contractual parameters descriptive of the placement of the second content when presented to end users;
    receiving the second content and the plurality of contractual parameters;
    after receiving the first content and the second content, evaluating at least one parameter of the plurality of contractual parameters associated with the identified portion;
    determining a value based on the evaluated at least one parameter; and
    presenting a view of the media item to a user wherein the user is associated with the advertisement distributor and is not an end user, the view comprising: the media item, the second content including the at least one advertisement, and at least one visual display parameter based on the determining that presents an indicator, on the view and in addition to the second content, that reflects the determined value, such that the user can confirm satisfaction of the agreement based on the presenting.

* * * * *